(12) United States Patent
McIntosh (10) Patent No.: US 11,492,137 B2
(45) Date of Patent: Nov. 8, 2022

(54) DISPLAY SYSTEMS AND METHODS

(71) Applicant: The Boeing Company, Chicago, IL (US)

(72) Inventor: Darren Carl McIntosh, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 901 days.

(21) Appl. No.: 16/362,331

(22) Filed: Mar. 22, 2019

(65) Prior Publication Data

US 2020/0298997 A1    Sep. 24, 2020

(51) Int. Cl.
*B64D 47/02* (2006.01)
*G02B 27/01* (2006.01)
*G02F 1/01* (2006.01)

(52) U.S. Cl.
CPC ......... *B64D 47/02* (2013.01); *G02B 27/0101* (2013.01); *G02F 1/0126* (2013.01); *G02F 1/0147* (2013.01)

(58) Field of Classification Search
None
See application file for complete search history.

(56) References Cited

U.S. PATENT DOCUMENTS

| | | | |
|---|---|---|---|
| 1,695,078 | A | 12/1928 | Barker |
| 8,651,664 | B2 | 2/2014 | Harvey et al. |
| 8,933,819 | B1 | 1/2015 | Garrettson |
| 2016/0257430 | A1 | 9/2016 | Hayashi et al. |
| 2016/0274447 | A1 | 9/2016 | Grundhofer et al. |
| 2019/0056650 | A1 | 2/2019 | Diao et al. |

FOREIGN PATENT DOCUMENTS

| | | |
|---|---|---|
| EP | 1107052 | 6/2001 |
| EP | 2549329 | 1/2013 |
| EP | 2565118 | 3/2013 |
| EP | 3106392 | 12/2016 |
| WO | WO 2016/181425 | 11/2016 |
| WO | WO 2018/119436 | 6/2018 |

OTHER PUBLICATIONS

European Patent Office, Extended European Search Report for related European Patent Application No. 20162000, dated Aug. 11, 2020.
Machine-generated English language translation of the abstract of WO 2016/181425, downloaded from Espacenet.com on Aug. 26, 2020.

*Primary Examiner* — Darryl J Collins
*Assistant Examiner* — Tamara Y. Washington
(74) *Attorney, Agent, or Firm* — Dascenzo Gates Intellectual Property Law, P.C.

(57) ABSTRACT

Display systems include a display structure having a display surface, and an optical projector that is positioned relative to the display structure and that is configured to project an image onto the display surface. Vehicles include a display system and vehicle structures, in which one vehicle structure includes the display structure of the display system and another vehicle structure includes the optical projector of the display system. Display methods include projecting an image onto a display surface.

25 Claims, 9 Drawing Sheets

DISPLAY SYSTEMS AND METHODS

FIELD

The present disclosure relates to projecting an image onto a display surface.

BACKGROUND

Images are displayed for a variety of reasons, including for the branding of products and services, the communication of information, and the conveyance of artistic creations.

SUMMARY

Display systems, vehicles with display systems, and display methods are disclosed. Display systems comprise a display structure having a display surface, and an optical projector that is positioned relative to the display structure and that is configured to project an image onto the display surface. Vehicles comprise a display system and vehicle structures, in which one vehicle structure comprises the display structure of the display system and another vehicle structure comprises the optical projector of the display system. Display methods comprise projecting an image onto a display surface.

DESCRIPTION

Display systems, vehicles with display systems, and display methods are disclosed herein. Generally, in the figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a given example without departing from the scope of the present disclosure.

Figure 1:
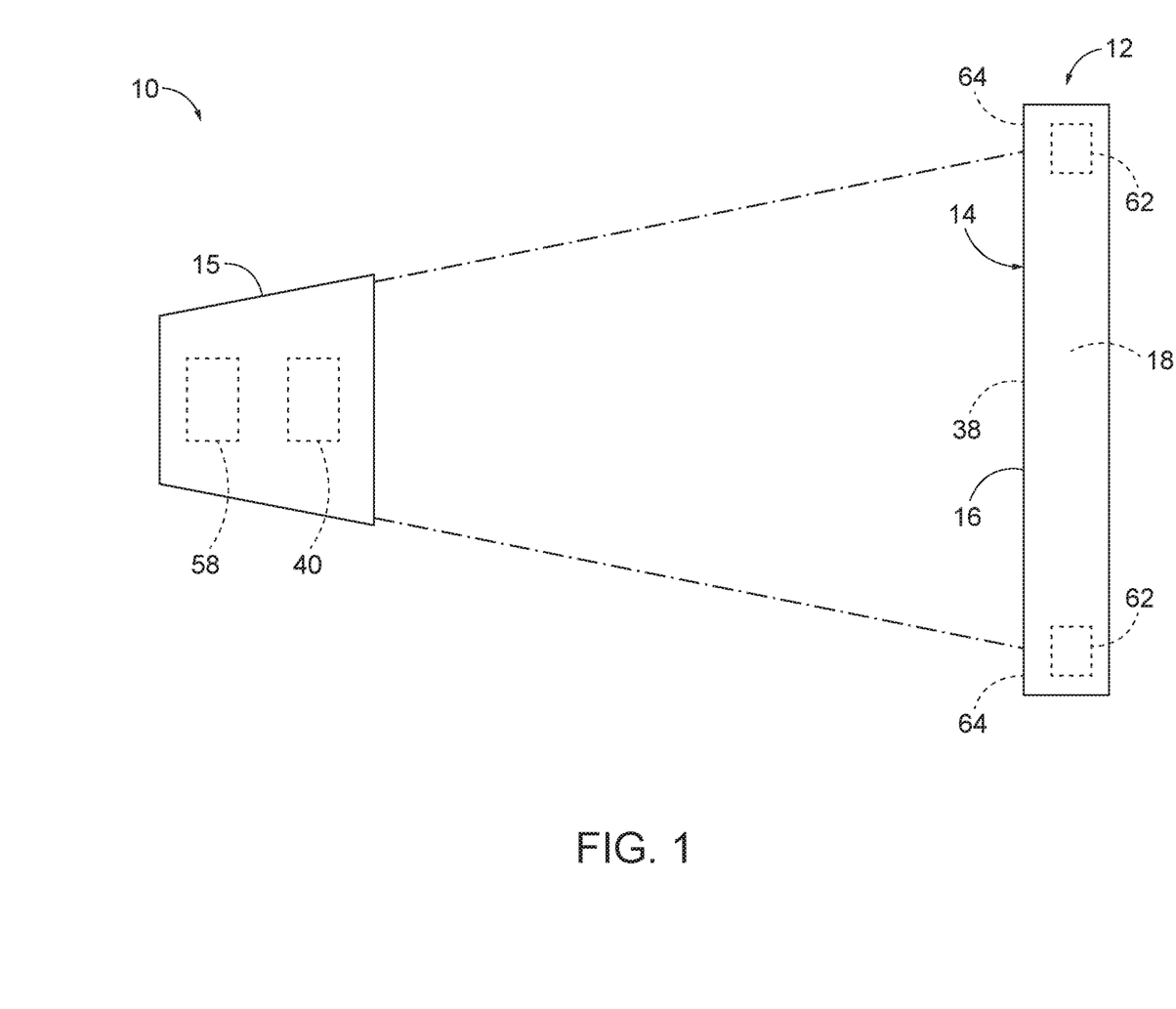
FIG. 1 is a schematic representation of display systems.

As schematically represented in FIG. 1, display systems 10 comprise a display structure 12 having a display surface 14, and an optical projector 15 that is positioned relative to the display structure 12 and that is configured to project an image 16 onto the display surface 14. In FIGS. 1 and 8-11, the projection of the image 16 is schematically represented by dash-dot lines. An image 16 may be displayed onto a display surface 14 for various reasons, such as to advertise a product or service, to display branding, to display artwork, and/or to communicate information. As discussed herein, display systems 10 may be incorporated into various structures, including (but not limited to) vehicles, such as aircraft, rail vehicles, other land vehicles such as buses, and marine vehicles, as well as buildings.

The optical projector 15 of a display system 10 may take any suitable form, examples of which include liquid crystal display (LCD) projectors, digital light processing (DLP) projectors, GOBO (go before optics) projectors, micro projectors, and laser light projectors. The display structure 12 of a display system 10 also may be any suitable structure onto which an image 16 is desired to be displayed. Illustrative examples of display structures discussed herein include vehicle structures, such as aerostructures of an aircraft, and building structures.

In some examples, the display surface 14 has a first state, in which indicia 38 are visible, and a second state, in which the indicia 38 are at least less visible. In some such examples, the indicia 38 are not visible at all when the display surface 14 is in the second state. Accordingly, when the display surface 14 is in the second state and when the image 16 is projected onto the display surface 14, the image 16 will have greater clarity than when the display surface 14 is in the first state and the indicia 38 are visible. Such display structure 12 may therefore be used to display the indicia 38 in some instances and to display the projected image 16 in other instances. Additionally or alternatively, in some instances, the image 16 may be projected and displayed in combination with the indicia 38 and or in combination with at least a subset of the indicia 38. As an example, it may be desirable to display the indicia 38 during daylight and to display a projected image 16 during nighttime. As a more specific example and with reference to FIGS. 2 and 3, it may be desirable to display indicia 38 in the form of a logo on the display surface 14 in some instances and to display an image 16 in the form of text on the display surface 14 in other instances.

In some examples, the indicia 38 are defined by color-changing pigment 18, that is, pigment that changes color, hue, saturation, intensity, tone, shade, and/or otherwise its visible appearance responsive to a change in external conditions. Accordingly, when indicia 38 are defined by color-changing pigment 18, the display surface 14 is configured to change between its first state and its second state responsive to a change in external conditions. For example, color-changing pigment 18 may be a thermochromic pigment that changes its appearances responsive to changes in temperature. Alternatively, color-changing pigment 18 may be a photochromic pigment that changes its appearance responsive to changes in, or the presence of certain, wavelengths of light incident on the photochromic pigment. For example, a photochromic pigment may changes its appearance responsive to ultraviolet (UV) light incident on the photochromic pigment, with such examples referred to as UV-photochromic pigments. In some examples, the photochromic pigment is clear, translucent, or even transparent when a threshold amount of UV light is incident thereon, and is colored when the threshold UV light is not incident thereon. Accordingly, such a photochromic pigment may be used to display indicia 38 during daylight (i.e., with the display surface in its first state) and to not display the indicia 38 during darkness, or relative darkness (i.e., with the display surface in its second state).

In some examples, the image 16 that is projected by the optical projector 15 is a video image or an animated image. Such display systems 10 may provide for unique advertising, branding, or other information sharing for entities that utilize such display systems.

Figure 2:
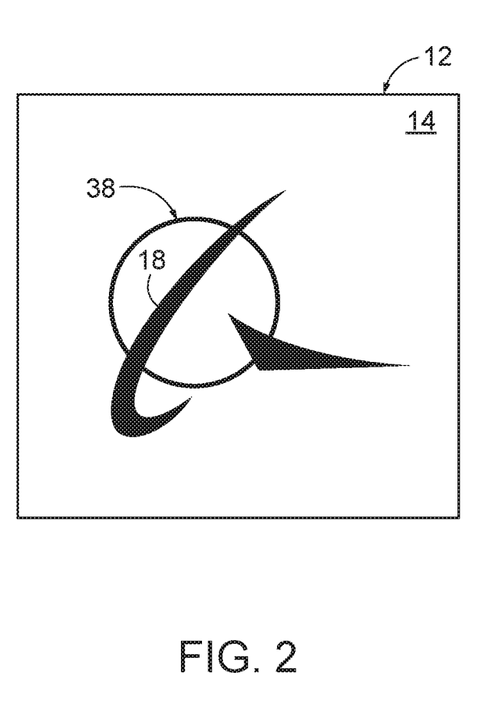
FIG. 2 is a schematic representation of an example display structure having a display surface in a first state with color-changing pigment visible and at least partially defining indicia.
Figure 3:
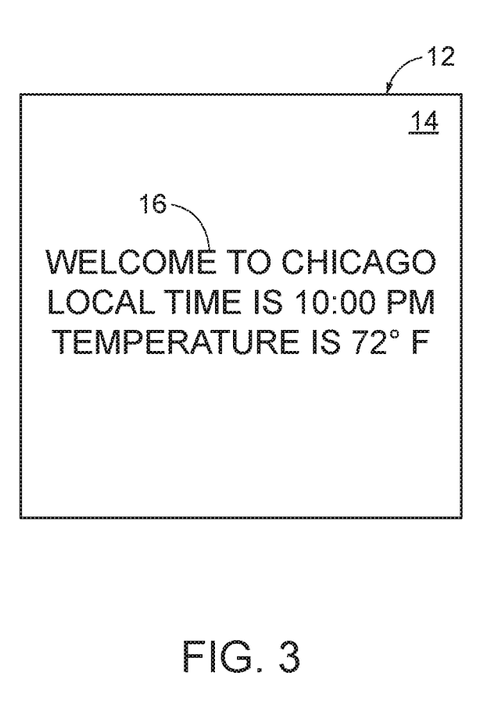
FIG. 3 is a schematic representation of the example display structure of FIG. 2, with the display surface in a second state with the color-changing pigment not visible and with an image projected onto the display surface.
Figure 4:
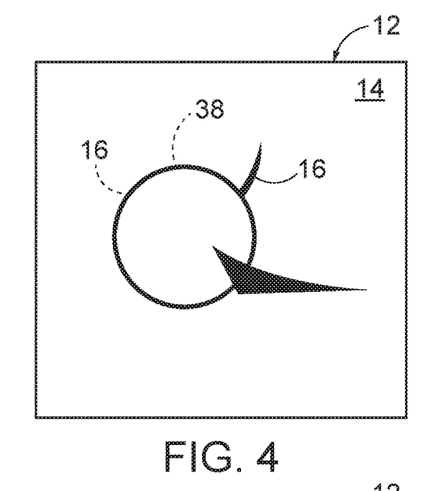
FIG. 4. is a schematic representation of the example display structure of FIG. 2, with the display surface in a second state with the color-changing pigment not visible and with an animated image projected onto the display surface.
Figure 5:
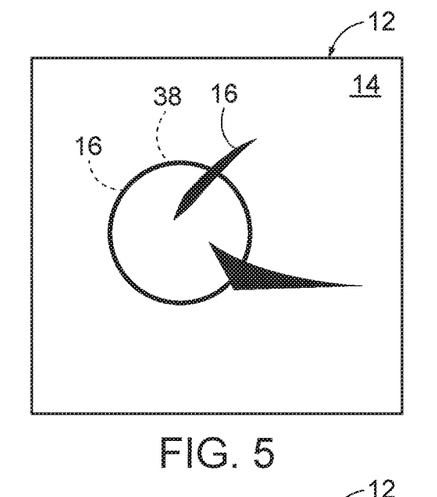
FIG. 5 is a schematic representation of the example display structure of FIG. 2 in sequence with FIG. 4, with the display surface in the second state with the color-changing pigment not visible and with the animated image projected onto the display surface.
Figure 6:
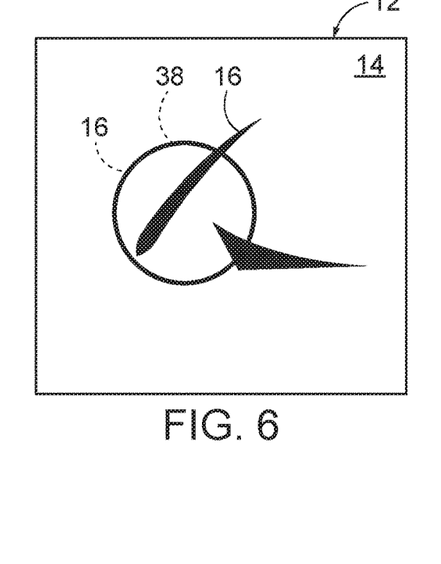
FIG. 6 is a schematic representation of the example display structure of FIG. 2 in sequence with FIGS. 4 and 5, with the display surface in the second state with the color-changing pigment not visible and with the animated image projected onto the display surface.
Figure 7:
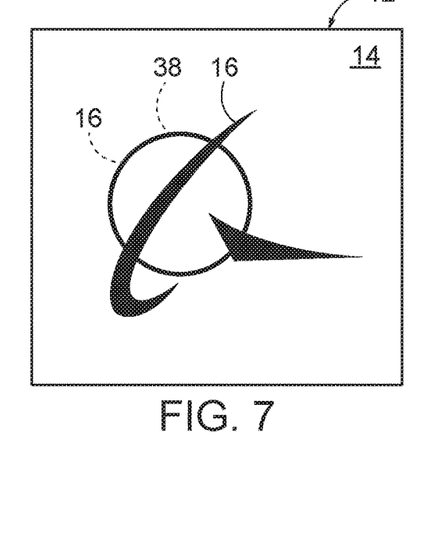
FIG. 7 is a schematic representation of the example display structure of FIG. 2 in sequence with FIGS. 4-6, with the display surface in the second state with the color-changing pigment not visible and with the animated image projected onto the display surface.

FIGS. 4-7 schematically illustrate in sequence an example animated image in the form of a portion of an animated logo. More specifically, in this example, the ring feature (representing aerial circumnavigation of Earth) is the animated image 16 being projected, while the remainder of the logo (representing Earth and an aircraft) is static. In a more particular example, the ring feature is separately visible as indicia 38 when the display surface 14 is in its first state, as represented in FIG. 2, and when the display surface 14 transitions to its second state, the static ring feature (i.e., indicia 38) is not visible, as represented in FIGS. 4-7, and instead the optical projector 15 projects the animated image 16 in the form of the animated ring feature.

In another example, a video image or an animated image may include text that scrolls (e.g., as a roller ticker) across the display surface 14.

Additionally or alternatively, the image 16 may be or include a static image.

In some examples, the optical projector 15 is configured to automatically redirect the image 16 responsive to a change in relative position of the display surface 14. In some examples, the optical projector 15 is configured to automatically maintain an entirety of the image 16 on the display surface 14. For example, in various applications of display systems 10, it may be important to ensure that the image 16 is incident solely on the display surface 14, as opposed to being inadvertently incident on another surface or structure, such as behind the display structure 12 relative to the optical projector 15. In aerospace applications, such as discussed herein for example, it may be important to ensure that the image 16, and more specifically the light that forms the image 16, is not incident on airport personnel such as on the flight deck, pilots and other personnel in aircraft cockpits, passengers in aircrafts, etc.

With continued reference to FIG. 1, in some such examples, the optical projector 15 comprises one or more sensors 40 that are configured to detect the change in position of the display surface 14 relative to the optical projector 15, and an actuator 58 that is configured to automatically redirect the image 16 responsive to the one or more sensors 40 detecting the change in relative position of the display surface 14. Any suitable sensors 40 and any suitable actuators 58 may be incorporated into display systems 10.

In some such examples, the one or more sensors 40 are configured to detect a boundary 64 of the display surface 14, and the actuator 58 is configured to automatically maintain the entirety of the image 16 on the display surface 14 responsive to the one or more sensors 40 detecting the boundary 64 of the display surface 14.

In some examples, the display structure 12 comprises one or more markers 62, and the one or more sensors 40 are configured to detect movement of the one or more markers 62 to detect a change in relative positon of the display surface 14. Additionally or alternatively, the one or more sensors 40 are configured to detect the one or more markers 62 to detect the boundary 64 of the display surface 14.

As an illustrative, non-exclusive example, markers 62 may comprise retro-reflective material, and sensors 40 may detect reflected light incident on the markers 62 (e.g., infrared (IR) light emitted by the optical projector 15 or by another component of the display system 10). In other examples, markers 62 may emit, rather than just reflect, light (e.g., IR light), and sensors 40 may detect the light therefrom. For example, markers 62 may comprise IR light emitting diodes (LEDs).

In some examples, the actuator 58 comprises one or more gimbals together with one or more motors configured to adjust the position(s) of the one or more gimbals and thereby to adjust the direction the image 16 is projected from the optical projector 15. In some examples, the actuator 58 is configured to redirect the image 16 only in a single dimension, while in other examples, the actuator 58 is configured to redirect the image 16 in two dimensions. In some applications, adjustment of the image 16 in only a single dimension may be necessary, such as based on environmental or other conditions associated with the display structure 12, the optical projector 15, and/or the structure by which the optical projector is supported.

Additionally or alternatively, in some examples, optical projector 15 is configured to correct for distortion based on the keystone effect when the display surface 14 is angled relative to the optical projector 15.

Turning now to FIGS. 8-12, illustrative non-exclusive examples of display systems 10 and applications thereof are illustrated; however, the examples of FIGS. 8-12 are non-exclusive and do not limit display systems 10 to the illustrated examples and applications of FIGS. 8-12. For the purpose of brevity, each previously discussed component, part, portion, aspect, region, etc. or variants thereof of display systems 10 may not be discussed, illustrated, and/or labeled again with respect to the examples of FIGS. 8-12; however, it is within the scope of the present disclosure that the previously discussed features, variants, etc. may be utilized with such examples.

FIGS. 8-11 each illustrate an example vehicle 50 that comprises vehicle structures 52 and at least one display system 10, in which one of the vehicle structures 52 comprises the display structure 12 of the display system 10 and another one of the vehicle structures 52 comprises the optical projector 15 of the display system 10.

Figure 8:
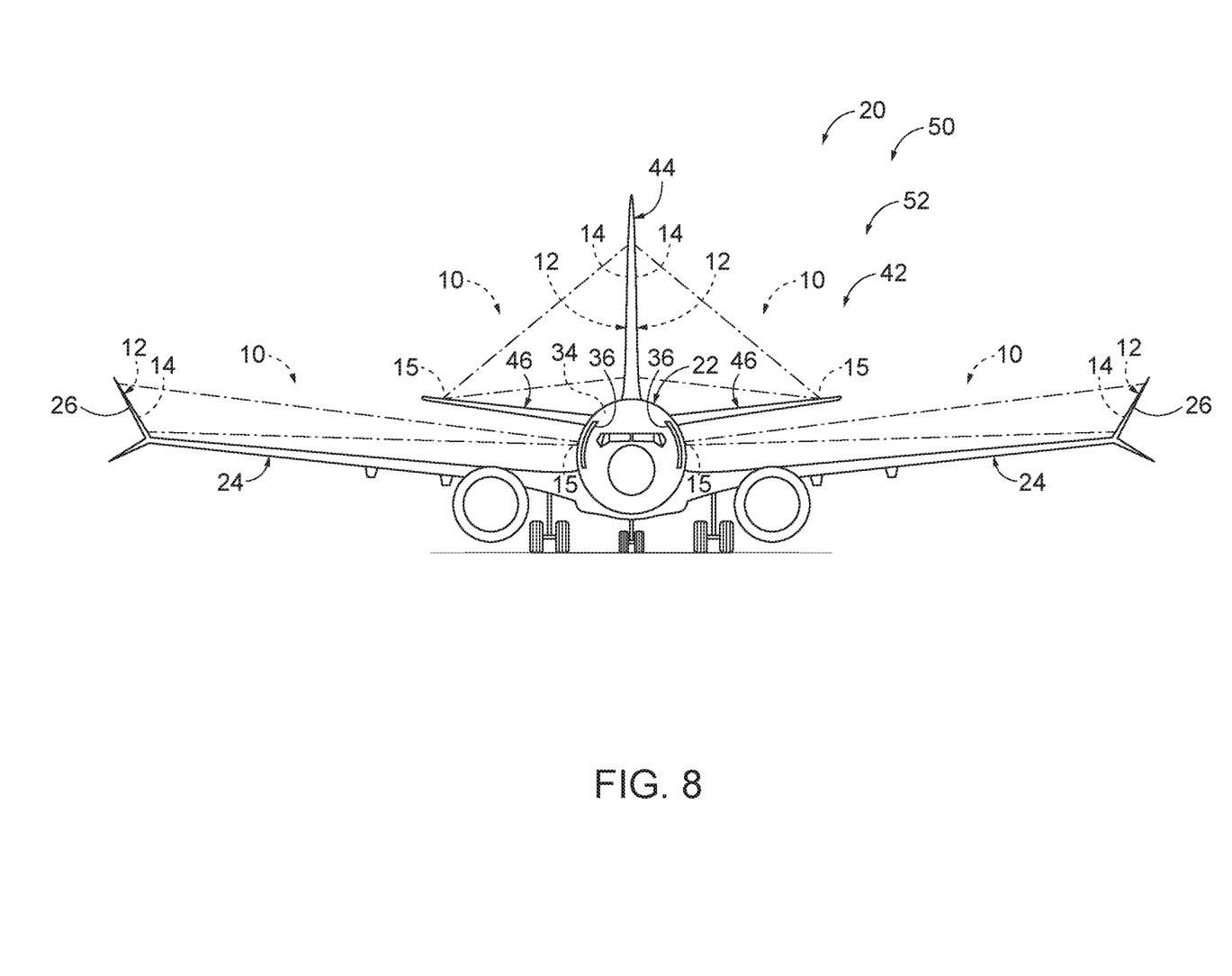
FIG. 8 is a front view of an example aircraft comprising a display system.
Figure 9:
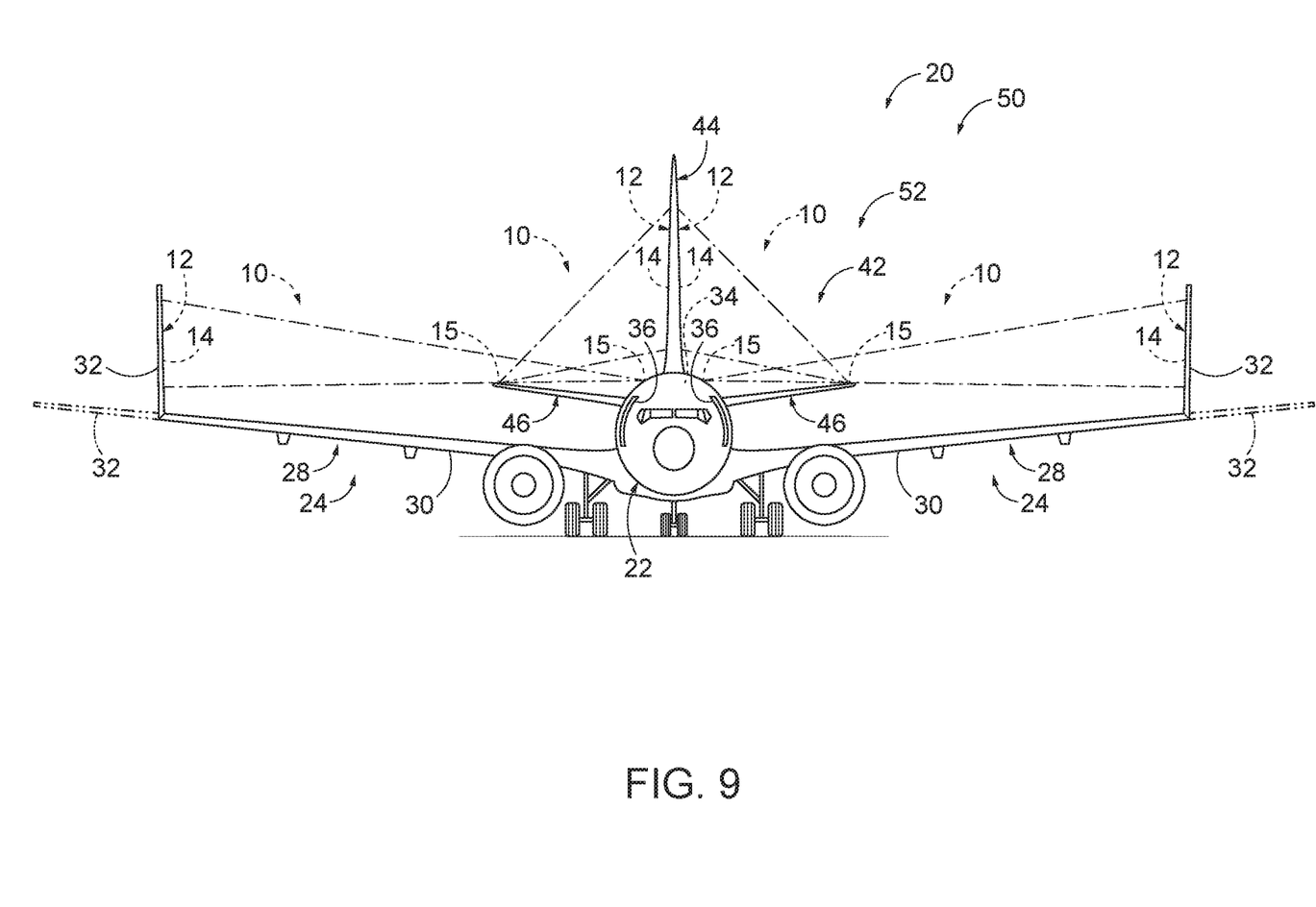
FIG. 9 is a front view of another example aircraft comprising a display system.

FIGS. 8 and 9 each illustrate example vehicles 50 in the form of aircraft 20. More specifically, aircraft 20 comprise aerostructures 42, and at least one display system 10, in which at least one of the aerostructures 42 comprises the display structure 12 of the display system 10 and at least one other of the aerostructures 42 comprises or supports the optical projector 15 of the display system 10. In the illustrated examples, the aerostructures 42 comprise a fuselage 22 that comprises a passenger cabin 34 and windows 36, two wings 24, a vertical stabilizer 44 supported by the fuselage 22, and a horizontal stabilizer 46 supported by the fuselage 22.

In some examples, a display system 10 of an aircraft 20 may be operative to project an image 16 only when the aircraft's logo lights are activated. In some such examples, activation of the aircraft's logo lights may simultaneously activate the optical projector 15 of a display system.

The aircraft 20 of each of FIGS. 8 and 9 are shown with four optional implementations of display systems 10.

In some examples, a wing 24 comprises the display structure 12 and the fuselage 22 comprises (or houses) the optical projector 15; however, in other examples a wing 24 may comprise both the display structure 12 and may comprise (or house) the optical projector 15.

In the example aircraft 20 of FIG. 8, wings 24 each comprise a winglet 26, and the winglet 26 comprises the display structure 12. In such examples, the image(s) 16 projected onto the winglet(s) 26 will be visible to passengers in the passenger cabin 34 looking out the windows 36. Moreover, in such examples, the display system(s) 10 may be able to project the image(s) 16 onto the winglet(s) 26 regardless of whether the aircraft 20 is in flight or on the ground.

In the example aircraft of FIG. 9, each wing 24 comprises a folding wing 28 that comprises a proximal portion 30 that is coupled to the fuselage 22 and a distal portion 32 that is hinged to the proximal portion 30 and spaced-away from the fuselage 22. The distal portion 32 of the folding wing 28 has a deployed position (illustrated in dash-dot-dot lines), in which the distal portion 32 and the proximal portion 30 are configured for flight of the aircraft 20, and a folded position (illustrated in solid lines), in which the distal portion 32 is pivoted upward relative to the deployed position. In the illustrated example, the distal portion 32 of each folding wing 28 comprises a display structure 12 of a display system 10. In some such examples, the optical projector 15 is configured to project an image 16 only when the distal portion 32 is in the folded position. Accordingly, the aircraft's controls may prevent operation of the optical projector 15 when the folding wings 28 are in their deployed position. As discussed herein, such a feature may be important to avoid an image 16 being undesirably projected onto an unintended structure. In some such examples, the optical projector 15 is configured to project an image 16 only when the distal portion 32 is in the folded position and responsive to the aircraft's logo lights being activated by aircraft personnel.

In some examples, such as when a winglet 26 (FIG. 8) or a distal portion 32 of a folding wing 28 (FIG. 9) comprises a display structure 12, the display surface 14 is within a line of sight from the passenger cabin 34 via a window 36.

In some examples, such as when a winglet 26 (FIG. 8) or a distal portion 32 of a folding wing 28 (FIG. 9) comprises a display structure 12, the optical projector 15 is configured to redirect the image 16 responsive to a change in droop of the wing 24. For example, the droop (or sag) of a wing 24 is affected by the weight of fuel housed therein, as well as on whether the aircraft is in flight or on the ground. Accordingly, in examples of display systems 10 in which a wing 24 comprises a display structure 12, it may be advantageous for the display systems 10 to incorporate an actuator 58 that redirects the image 16 up and down based on the droop of the aircraft wing.

In some examples, the vertical stabilizer 44 comprises the display structure 12. In some such examples, one or both horizontal stabilizers 46 comprise an optical projector 15. In such examples, the image(s) 16 may not be visible to passengers in the passenger cabin 34, but instead may be visible to other individuals, such as looking out of airport windows.

In some examples, the fuselage 22 comprises the display structure 12, and one or more of a wing 24, the vertical stabilizer 44, or a horizontal stabilizer 46 comprises the optical projector 15. Such examples may be particularly useful to project image(s) 16 that provide an aircraft with a striking visual (e.g., sparkling stars) when the aircraft is on the ground and visible to travelers looking out of an airport window.

Figure 10:
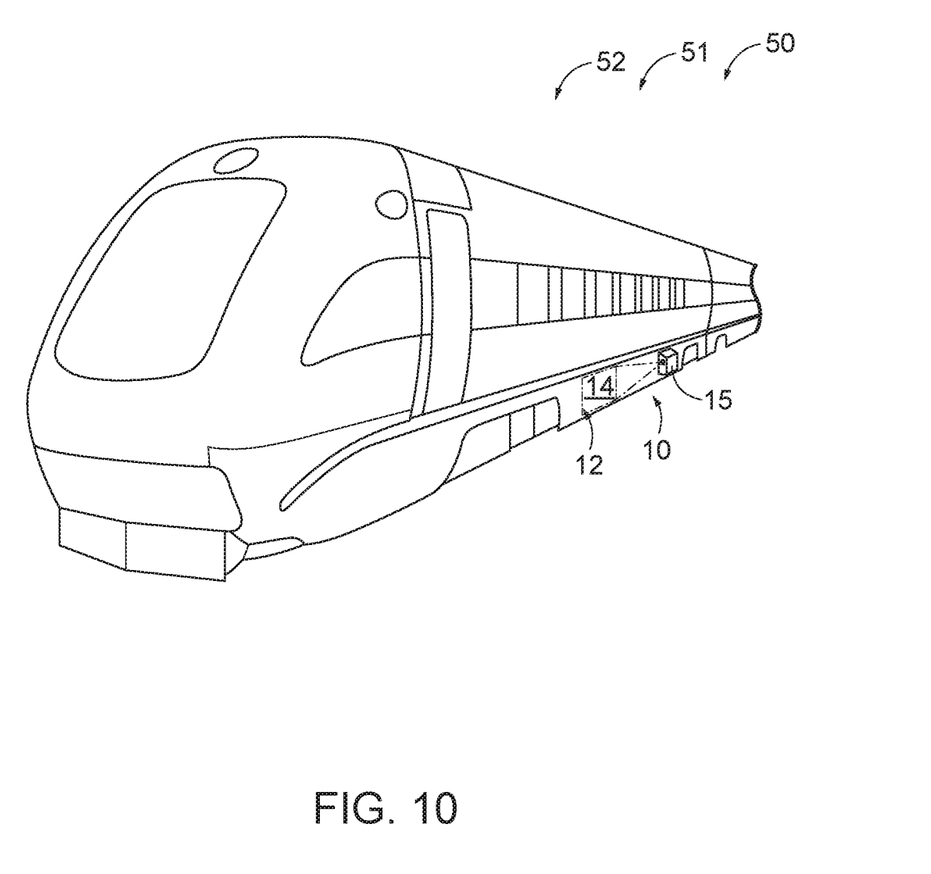
FIG. 10 is a perspective view of an example train comprising a display system.

FIG. 10 illustrates an example vehicle 50 in the form of a train 51 comprising at least one display system 10.

Figure 11:
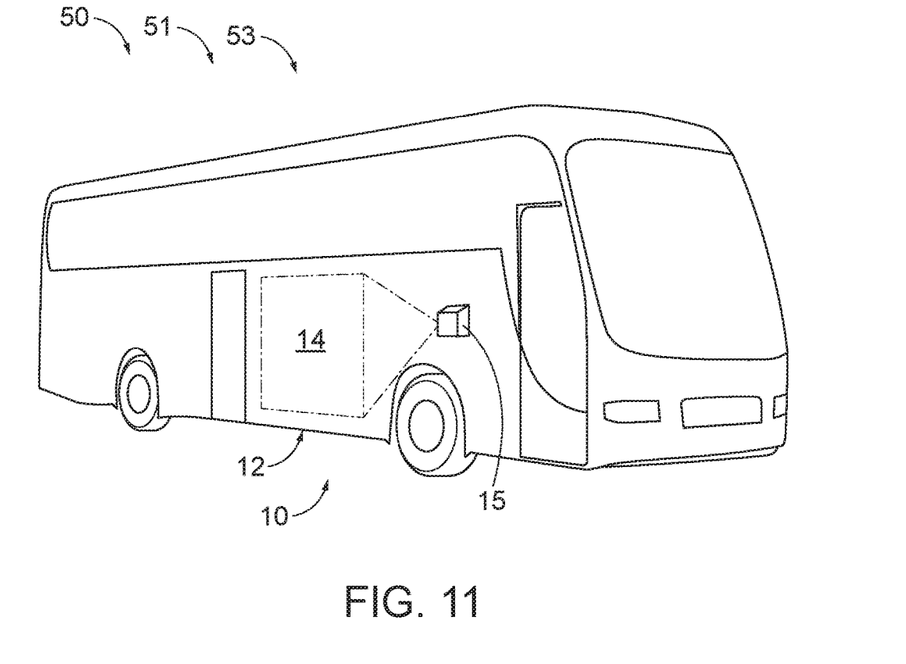
FIG. 11 is a perspective view of an example bus comprising a display system.

FIG. 11 illustrates an example vehicle 50 in the form of a bus 53 comprising at least one display system 10.

Figure 12:
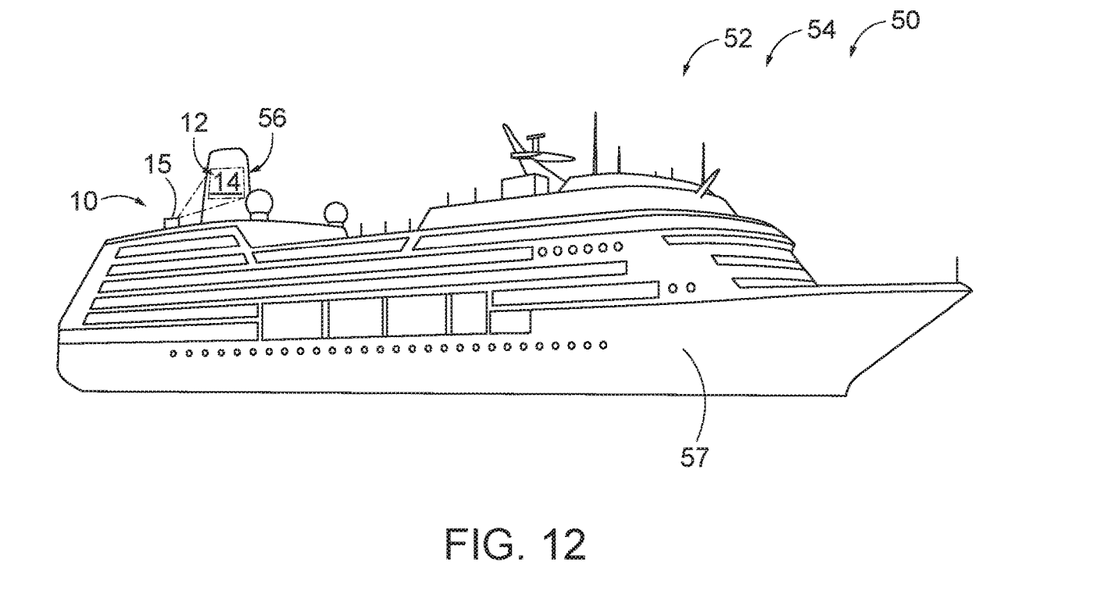
FIG. 12 is a perspective view of an example marine vehicle comprising a display system.

FIG. 12 illustrates an example vehicle 50 in the form of a marine vehicle 54 comprising at least one display system 10. In the specific example of FIG. 12, the vehicle structures 52 of the marine vehicle 54 comprise a funnel 56, and the funnel 56 comprises the display structure 12 of a display system 10. In other examples, other portions of the marine vehicle 54, such as its hull, comprise the display structure 12 of a display system 10.

Figure 13:
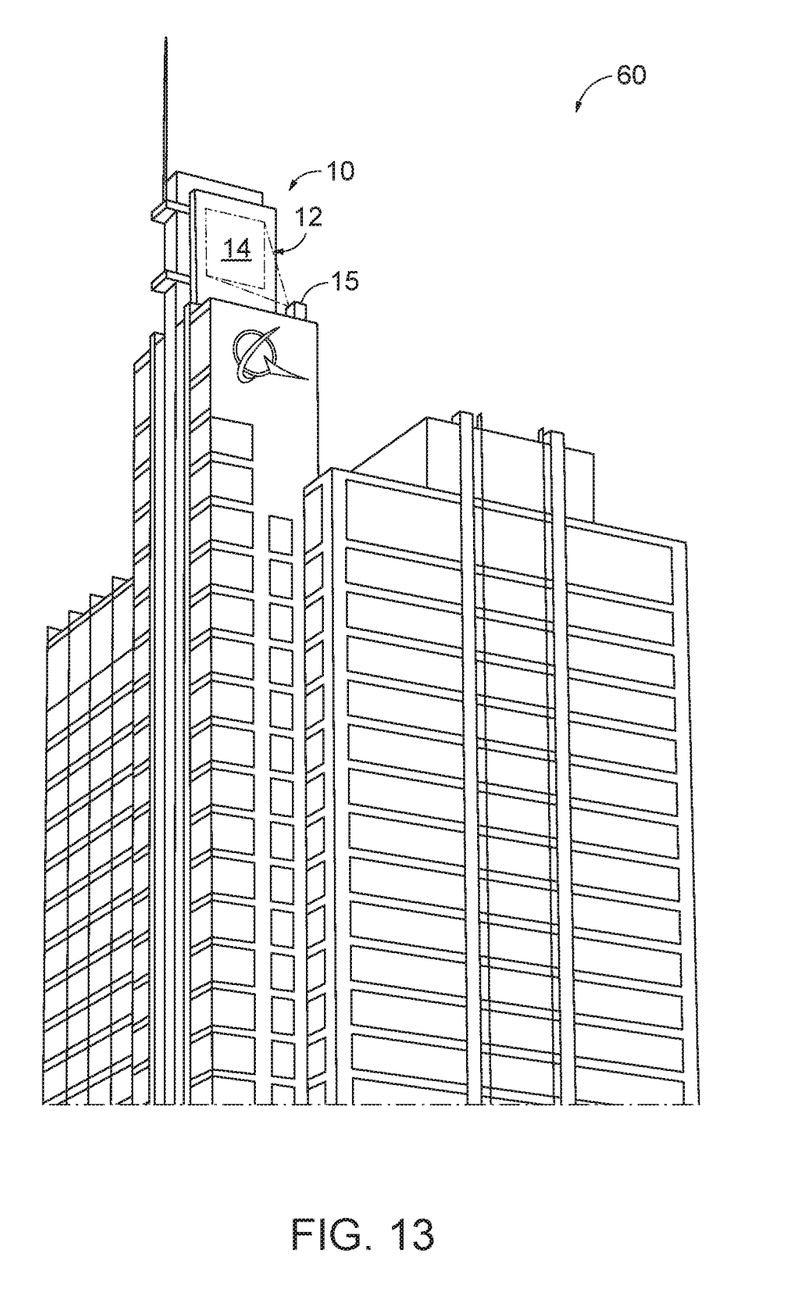
FIG. 13 is a perspective view of an example building comprising a display system.

FIG. 13 illustrates an example building 60 that comprises a display system 10. In other examples, a building 60 may comprise the display structure 12 of a display system 10, while the optical projector 15 of the display system is spaced away from the building 60.

Figure 14:
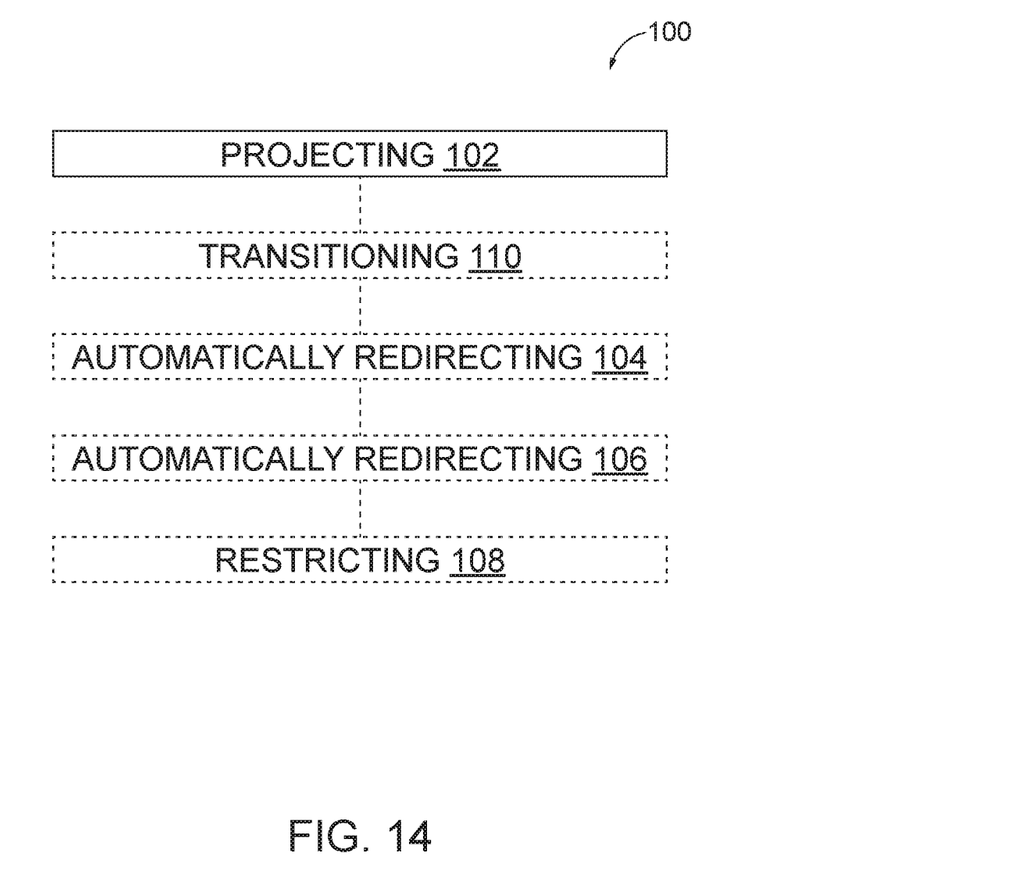
FIG. 14 is a flowchart schematically representing display methods.

FIG. 14 schematically provides a flowchart that represents illustrative, non-exclusive examples of display methods 100 according to the present disclosure. In FIG. 14, some steps are illustrated in dashed boxes indicating that such steps may be optional or may correspond to an optional version of a display method 100. The display methods 100 and steps thereof illustrated in FIG. 14 are not limiting and other methods and steps are within the scope of the present disclosure, including methods having greater than or fewer than the number of steps illustrated, as understood from the discussions herein.

As represented in FIG. 14, display methods 100 comprise at least projecting 102 an image onto a display surface, such as a display surface 14 of a display structure 12 of a display system 10, discussed in detail herein.

In some examples, the display surface is at least partially defined by color-changing pigment. In some such examples, the display surface is at least partially photochromic and/or at least partially UV-photochromic. In some examples, the display surface is at least partially thermochromic.

In some examples, the display surface has a first state, in which indicia are visible, and a second state, in which the indicia are at least less visible and optionally not visible. In such examples, and as optionally represented in FIG. 14, the display method 100 further comprises transitioning 110 the display surface between the first state and the second state. In some such examples, the transitioning 110 comprises automatically transitioning the display surface between the first state and the second state. In some examples, the projecting 102 is performed when the display surface is in the second state. In some examples, the projecting 102 is performed solely when the display surface is in the second state. In some examples, the indicia are defined by color-changing pigment. In some examples, the display surface is configured to be in the first state during daylight and in the second state during darkness, or at least relative darkness. In some examples, the display surface is configured to be in the first state when in the presence of a threshold amount of UV light and in the second state when in the absence of the threshold amount of UV light.

In some examples, the image is a video image or an animated image. In other examples, the image is a static image.

As optionally represented in FIG. 14, some display methods 100 further comprise automatically redirecting 104 the image responsive to a change in relative position of the display surface. Additionally or alternatively, as optionally represented in FIG. 14, some display methods 100 further comprise automatically directing 106 an entirety of the image onto the display surface.

In some examples, the projecting 102 comprises projecting the image onto a vehicle structure of a vehicle. For example, the vehicle may be an aircraft, a train, a bus, or other land vehicle, or a marine vehicle.

In some examples, the projecting 102 comprises projecting the image onto an aerostructure of an aircraft. In some such examples, the projecting 102 comprises projecting the image onto a wing of the aircraft. In some examples that include automatically redirecting 104, the automatically redirecting 104 comprises automatically redirecting the image responsive to a change in droop of the wing.

In some examples, the projecting 102 comprises projecting the image onto a winglet of the wing.

In some examples, the wing is a folding wing, and the projecting 102 comprises projecting the image onto a distal portion of a folding wing when the distal portion is pivoted upward to a folded position. In some such examples, as optionally represented in FIG. 14, display methods 100 further comprise restricting 108 the projecting 102 when the distal portion 32 is not in the folded position.

In some examples, the projecting 102 comprises projecting the image onto a vertical stabilizer of an aircraft.

In some examples, the projecting 102 comprises projecting the image onto a fuselage of an aircraft.

In some examples, the projecting 102 comprises projecting the image onto a funnel, a hull, or other structure of a marine vehicle.

In some examples, the projecting 102 comprises projecting the image onto a building.

Illustrative, non-exclusive examples of inventive subject matter according to the present disclosure are described in the following enumerated paragraphs:

A. A display system (10), comprising:
a display structure (12) having a display surface (14); and
an optical projector (15) positioned relative to the display structure (12) and configured to project an image (16) onto the display surface (14).

A1. The display system (10) of paragraph A, wherein the display structure (12) comprises color-changing pigment (18) that at least partially defines the display surface (14).

A2. The display system (10) of any of paragraphs A-A1, wherein the display surface (14) is at least partially photochromic or at least partially thermochromic.

A3. The display system (10) of any of paragraphs A-A2, wherein the display surface (14) is at least partially UV-photochromic.

A4. The display system (10) of any of paragraphs A-A3, wherein the display surface (14) has a first state, in which indicia (38) are visible, and a second state, in which the indicia (38) are at least less visible, and optionally not visible.

A4.1. The display system (10) of paragraph A4, wherein the image (16), when projected onto the display surface (14), has greater clarity when the display surface (14) is in the second state than when the display surface (14) is in the first state.

A4.2. The display system (10) of any of paragraphs A4-A4.1 when depending from paragraph A1, wherein the indicia (38) are defined by the color-changing pigment (18).

A4.3. The display system (10) of any of paragraphs A4-A4.2, wherein the display surface (14) is configured to be in the first state during daylight and in the second state during darkness.

A4.4. The display system (10) of any of paragraphs A4-A4.3 when depending from paragraph A3, wherein the display surface (14) is configured to be in the first state when in the presence of a threshold amount of UV light and in the second state when in the absence of the threshold amount of UV light.

A5. The display system (10) of any of paragraphs A-A4.4, wherein the image (16) is a video image or an animated image.

A6. The display system (10) of any of paragraphs A-A5, wherein the image (16) is a static image.

A7. The display system (10) of any of paragraphs A-A6, wherein the optical projector (15) is configured to automatically redirect the image (16) responsive to a change in relative position of the display surface (14).

A7.1. The display system (10) of paragraph A7, wherein the optical projector (15) comprises:
one or more sensors (40) configured to detect the change in relative positon of the display surface (14); and
an actuator (58) configured to automatically redirect the image (16) responsive to the one or more sensors (40) detecting the change in relative positon of the display surface (14).

A7.1.1. The display system (10) of paragraph A7.1, wherein:
the display structure (12) comprises one or more markers (62); and
the one or more sensors (40) are configured to detect movement of the one or more markers (62) to detect the change in relative positon of the display surface (14).

A8. The display system (10) of any of paragraphs A-A7.1.1, wherein the optical projector (15) is configured automatically to maintain an entirety of the image (16) on the display surface (14).

A8.1. The display system (10) of paragraph A8, wherein the optical projector (15) comprises:
one or more sensors (40) configured to detect a boundary (64) of the display surface (14); and
an actuator (58) configured to automatically maintain the entirety of the image (16) on the display surface (14) responsive to the one or more sensors (40) detecting the boundary (64) of the display surface (14).

A8.1.1. The display system (10) of paragraph A8.1, wherein:
the display structure (12) comprises one or more markers (62); and
the one or more sensors (40) are configured to detect the one or more markers (62) to detect the boundary (64) of the display surface (14).

B. An aircraft (20), comprising:
aerostructures (42); and
the display system (10) of any of paragraphs A-A8.1.1, wherein one of the aerostructures (42) comprises the display structure (12) and another one of the aerostructures (42) comprises or supports the optical projector (15).

B1. The aircraft (20) of paragraph B, wherein:
the aerostructures (42) comprise a fuselage (22) and a wing (24) supported by the fuselage (22); and
the wing (24) comprises the display structure (12).

B1.1. The aircraft (20) of paragraph B1, wherein:
the wing (24) comprises a winglet (26); and
the winglet (26) comprises the display structure (12).

B1.2. The aircraft (20) of any of paragraphs B1B1.1, wherein:

the wing (24) comprises a folding wing (28);

the folding wing (28) comprises a proximal portion (30) coupled to the fuselage (22) and a distal portion (32) hinged to the proximal portion (30) and spaced-away from the fuselage (22);

the distal portion (32) has a deployed position, in which the distal portion (32) and the proximal portion (30) are configured for flight of the aircraft (20), and a folded position, in which the distal portion (32) is pivoted upward relative to the deployed position; and the distal portion (32) comprises the display structure (12).

B1.2.1. The aircraft (20) of paragraph B1.2, wherein the optical projector (15) is configured to project the image (16) only when the distal portion (32) is in the folded position.

B1.2.1.1. The aircraft (20) of paragraph B1.2.1, wherein the optical projector (15) is configured to project the image (16) only when the distal portion (32) is in the folded position and responsive to logo lights of the aircraft (20) being activated.

B1.3. The aircraft (20) of any of paragraphs B1-B1.2.1.1, wherein:

the fuselage (22) comprises a passenger cabin (34) and a window (36); and the display surface (14) is within a line of sight from the passenger cabin (34) via the window (36).

B1.4. The aircraft (20) of any of paragraphs B1-B1.3, wherein the optical projector (15) is configured to redirect the image (16) responsive to a change in droop of the wing (24).

B2. The aircraft (20) of paragraph B, wherein:

the aerostructures (42) comprise a fuselage (22) and a vertical stabilizer (44) supported by the fuselage (22); and the vertical stabilizer (44) comprises the display structure (12).

B2.1. The aircraft (20) of paragraph B2, wherein:

the aerostructures (42) further comprise a horizontal stabilizer (46) supported by the fuselage (22); and the horizontal stabilizer (46) comprises the optical projector (15)

B3. The aircraft (20) of any of paragraphs B1-B2, wherein the fuselage (22) comprises the optical projector (15).

B4. The aircraft (20) of paragraph B, wherein:

the aerostructures (42) comprise a fuselage (22); and the fuselage (22) comprises the display structure (12).

B4.1. The aircraft (20) of paragraph B4.1, wherein:

the aerostructures (42) further comprise one or more of a wing (24), a vertical stabilizer (44), or a horizontal stabilizer (46); and one of the wing (24), the vertical stabilizer (44), or the horizontal stabilizer (46) comprises the optical projector (15).

B5. The aircraft (20) of any of paragraphs B-B4.1, wherein the optical projector (15) is configured to be activated to project the image (16) responsive to logo lights of the aircraft (20) being activated.

C. A vehicle (50), comprising:

vehicle structures (52); and the display system (10) of any of paragraphs A-A8.1.1, wherein one of the vehicle structures (52) comprises the display structure (12) and another one of the vehicle structures (52) comprises the optical projector (15).

C1. The vehicle (50) of paragraph C, wherein the vehicle (50) is a train (51).

C2. The vehicle (50 paragraph C, wherein the vehicle (50) is a bus (53)

C3. The vehicle (50) of paragraph C, wherein the vehicle (50) is a marine vehicle (54).

C3.1. The vehicle (50) of paragraph C3, wherein:

the vehicle structures (52) comprise a funnel (56) or a hull (57); and the funnel (56) or the hull (57) comprises the display structure (12).

D1. The display system (10) of any of paragraphs A-A8.1.1, further comprising a building (60), wherein the building (60) comprises the display structure (12).

E. The use of any of paragraphs A-D1 to advertise a product, a service, or a brand.

F. The use of any of paragraphs A-D1 to display artwork.

G. The use of any of paragraphs A-D1 to communicate information.

H. A display method (100), comprising projecting (102) an image (16) onto a display surface (14).

H1. The display method (100) of paragraph H, wherein the display surface (14) is at least partially defined by color-changing pigment (18).

H2. The display method (100) of any of paragraphs H-H1, wherein the display surface (14) is at least partially photochromic or at least partially thermochromic.

H3. The display method (100) of any of paragraphs H-H2, wherein the display surface (14) is at least partially UV-photochromic.

H4. The display method (100) of any of paragraphs H-H3, wherein:

the display surface (14) has a first state, in which indicia (38) are visible, and a second state, in which the indicia (38) are at least less visible and optionally not visible; and the display method (100) further comprises transitioning (110) the display surface (14) between the first state and the second state.

H4.1. The display method (100) of paragraph H4, wherein the transitioning (110) the display surface (14) between the first state and the second state comprises automatically transitioning the display surface (14) between the first state and the second state.

H4.2. The display method (100) of any of paragraphs H4-H4.1, wherein the projecting (102) is performed when the display surface (14) is in the second state.

H4.3. The display method (100) of any of paragraphs H4-H4.2, wherein the projecting (102) is performed solely when the display surface (14) is in the second state.

H4.4. The display method (100) of any of paragraphs H4-4.3 when depending from paragraph H1, wherein the indicia (38) are defined by the color-changing pigment (18).

H4.5. The display method (100) of any of paragraphs H4-H4.4, wherein the display surface (14) is configured to be in the first state during daylight and in the second state during darkness.

H4.6. The display method (100) of any of paragraphs H4-H4.3 when depending from paragraph H3, wherein the display surface (14) is configured to be in the first state when in the presence of a threshold amount of UV light and in the second state when in the absence of the threshold amount of UV light.

H5. The display method (100) of any of paragraphs H-H4.6, wherein the image (16) is a video image or an animated image.

H6. The display method (100) of any of paragraphs H-H5, wherein the image (16) is a static image.

H7. The display method (100) of any of paragraphs H-H6, further comprising automatically redirecting (104) the image (16) responsive to a change in relative position of the display surface (14).

H8. The display method (100) of any of paragraphs H-H7, further comprising automatically directing (106) an entirety of the image (16) onto the display surface (14).

H9. The display method (100) of any of paragraphs H-H8, wherein the projecting (102) comprises projecting the image (16) onto an aerostructure (42) of an aircraft (20).

H9.1 The display method (100) of paragraph H9, wherein the projecting (102) comprises projecting the image (16) onto a wing (24) of the aircraft (20).

H9.1.1. The display method (100) of paragraph H9.1, wherein the projecting (102) comprises projecting the image (16) onto a winglet (26) of the wing (24).

H9.1.2. The display method (100) of any of paragraphs H9.1-H9.1.1, wherein:
the wing (24) is a folding wing (28); and
the projecting (102) comprises projecting the image (16) onto a distal portion (32) of the folding wing (28) when the distal portion (32) is pivoted upward to a folded position.

H9.1.2.1. The display method (100) of paragraph H9.1.2, further comprising restricting (108) the projecting (102) when the distal portion (32) is not in the folded position.

H9.1.2. The display method (100) of any of paragraphs H9.1-H9.1.2.1 when depending from paragraph H7, wherein the automatically redirecting (104) the image (16) comprises automatically redirecting the image (16) responsive to a change in droop of the wing (24).

H9.2. The display method (100) of paragraph G9, wherein the projecting (102) comprises projecting the image (16) onto a vertical stabilizer (44) of the aircraft (20).

H9.3. The display method (100) of paragraph H9, wherein the projecting (102) comprises projecting the image (16) onto a fuselage (22) of the aircraft (20).

H10. The display method (100) of any of paragraphs H-H8, wherein the projecting (102) comprises projecting the image (16) onto a vehicle structure (52) of a vehicle (50).

H10.1. The display method (100) of paragraph H10, wherein the vehicle (50) is a train (51).

H10.2. The display method (100) of paragraph H10, wherein the vehicle (50) is a bus (53).

H10.3. The display method (100) of paragraph H10, wherein the vehicle (50) is a marine vehicle (54).

H10.3.1. The display method (100) of paragraph H10.3, wherein the projecting (102) comprises projecting the image (16) onto a funnel (56) or a hull (57) of the marine vehicle (54).

H11. The display method (100) of any of paragraphs H-H8, wherein the projecting (102) comprises projecting the image (16) onto a building (60).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein, and such inventive subject matter may find utility in apparatuses, systems, and/or methods that are not expressly disclosed herein.

The invention claimed is:

1. An aircraft, comprising:
a display system, comprising:
a display structure having a display surface, wherein the display surface has a first state, in which indicia are visible, and a second state, in which the indicia are at least less visible; and
an optical projector positioned relative to the display structure and configured to project an image onto the display surface, wherein the optical projector is configured to (i) automatically redirect the image responsive to a change in relative position of the display surface, or (ii) automatically maintain an entirety of the image on the display surface; and
aerostructures, wherein one of the aerostructures comprises the display structure and another one of the aerostructures comprises or supports the optical projector.

2. The aircraft of claim 1, wherein the indicia are defined by a color-changing pigment.

3. The aircraft of claim 1, wherein the display surface is at least partially photochromic or at least partially thermochromic.

4. The aircraft of claim 1, wherein the display surface is at least partially UV-photochromic.

5. The aircraft of claim 1, wherein the image, when projected onto the display surface, has greater clarity when the display surface is in the second state than when the display surface is in the first state.

6. The aircraft of claim 1, wherein the display surface is configured to be in the first state during daylight and in the second state during darkness.

7. The aircraft of claim 1, wherein the display surface is configured to be in the first state when in the presence of a threshold amount of UV light and in the second state when in the absence of the threshold amount of UV light.

8. The aircraft of claim 1, wherein:
the aerostructures comprise a fuselage and a wing supported by the fuselage; and
the wing comprises the display structure.

9. The aircraft of claim 8, wherein:
the wing comprises a winglet; and
the winglet comprises the display structure.

10. The aircraft of claim 9, wherein:
the wing comprises a folding wing;
the folding wing comprises a proximal portion coupled to the fuselage and a distal portion hinged to the proximal portion and spaced-away from the fuselage;
the distal portion has a deployed position, in which the distal portion and the proximal portion are configured for flight of the aircraft, and a folded position, in which the distal portion is pivoted upward relative to the deployed position; and
the distal portion comprises the display structure.

11. The aircraft of claim 10, wherein the optical projector is configured to project the image only when the distal portion is in the folded position.

12. The aircraft of claim 8, wherein the optical projector is configured to redirect the image responsive to a change in droop of the wing.

13. The aircraft of claim 1, wherein:
the aerostructures comprise a fuselage;
the fuselage comprises a passenger cabin and a window; and
the display surface is within a line of sight from the passenger cabin via the window.

14. The aircraft of claim 1, wherein:
the aerostructures comprise a fuselage and a vertical stabilizer supported by the fuselage; and
the vertical stabilizer comprises the display structure.

15. The aircraft of claim 14, wherein:
the aerostructures further comprise a horizontal stabilizer supported by the fuselage; and
the horizontal stabilizer comprises or supports the optical projector.

16. The aircraft of claim 1, wherein:
the aerostructures comprise a fuselage; and
the fuselage comprises the display structure.

17. A display system, comprising:
a display structure having a display surface, wherein the display surface has a first state, in which indicia are visible, and a second state, in which the indicia are at least less visible; and
an optical projector positioned relative to the display structure and configured to project an image onto the display surface, wherein the optical projector is configured to (i) automatically redirect the image responsive to a change in relative position of the display surface, or (ii) automatically maintain an entirety of the image on the display surface.

18. A display method, comprising:
projecting an image onto a display surface, wherein the display surface has a first state, in which indicia are visible, and a second state, in which the indicia are at least less visible, wherein the projecting comprises (i) automatically redirecting the image responsive to a change in relative position of the display surface or (ii) automatically maintaining an entirety of the image on the display surface; and
transitioning the display surface between the first state and the second state.

19. The display method of claim 18, wherein the projecting further comprises ensuring that the image is not incident on another surface beyond the display surface.

20. The display method of claim 19, wherein the display surface is incorporated into a first aircraft, and wherein the another surface is of a second aircraft, passengers of the second aircraft, personnel in a cockpit of the second aircraft, or airport personnel.

21. An aircraft, comprising:
a display system, comprising:
a display structure having a display surface, wherein the display surface has a first state, in which indicia are visible, and a second state, in which the indicia are at least less visible; and
an optical projector positioned relative to the display structure and configured to project an image onto the display surface; and
aerostructures, wherein one of the aerostructures comprises the display structure and another one of the aerostructures comprises or supports the optical projector, wherein the aerostructures comprise a fuselage and a wing supported by the fuselage, and wherein the wing comprises the display structure;
wherein the optical projector is configured to redirect the image responsive to a change in droop of the wing.

22. An aircraft, comprising:
a display system, comprising:
a display structure having a display surface, wherein the display surface has a first state, in which indicia are visible, and a second state, in which the indicia are at least less visible; and
an optical projector positioned relative to the display structure and configured to project an image onto the display surface; and
aerostructures, wherein one of the aerostructures comprises the display structure and another one of the aerostructures comprises or supports the optical projector;
wherein:
the aerostructures comprise a fuselage and a folding wing supported by the fuselage;
the folding wing comprises a proximal portion coupled to the fuselage and a distal portion hinged to the proximal portion and spaced-away from the fuselage;
the distal portion has a deployed position, in which the distal portion and the proximal portion are configured for flight of the aircraft, and a folded position, in which the distal portion is pivoted upward relative to the deployed position; and
the distal portion comprises the display structure.

23. The aircraft of claim 22, wherein the optical projector is configured to project the image only when the distal portion is in the folded position.

24. The aircraft of claim 22, wherein the optical projector is configured to redirect the image responsive to a change in droop of the folding wing.

25. The aircraft of claim 22, wherein the optical projector is configured to (i) automatically redirect the image responsive to a change in relative position of the display surface, or (ii) automatically maintain an entirety of the image on the display surface.

* * * * *